Patented Nov. 8, 1938

2,136,348

UNITED STATES PATENT OFFICE 2,136,348

STABILIZING VINYLIDENE CHLORIDE

Ralph M. Wiley, Midland, Mich., assignor to The Dow Chemical Company, Midland, Mich., a corporation of Michigan No Drawing. Original application July 2, 1937, Serial No. 151,721. Divided and this application March 23, 1938, Serial No. 197,616

5 Claims. (Cl. 23—250)

This invention relates to the art of stabilizing vinylidene chloride, $H_2C=CCl_2$, and to improved compositions thereby obtained.

When vinylidene chloride is exposed to the action of air, light, elevated temperatures, or to any of several catalytic agents, it polymerizes readily forming resinous products, the properties of which will depend to a great extent upon the conditions of polymerization. This tendency to polymerize is so persistent that it has become necessary to provide a means by which vinylidene chloride may be maintained in the monomeric form at least temporarily, so that it can be stored for a period of time following its preparation and prior to its use in chemical reactions or in resin formation. It is accordingly among the objects of the present invention to provide a means whereby vinylidene chloride may be inhibited against polymerization. A further object is to provide a relatively stable monomeric vinylidene chloride. Another object is to provide a stabilized vinylidene chloride composition from which the stabilizing agent can be readily removed when desired.

I have discovered that vinylidene chloride can be inhibited against polymerization by adding thereto relatively small quantities of certain inorganic compounds, or a combination thereof, and further that the stabilizing agents can again be readily separated from the vinylidene chloride to render the same capable of polymerization. Among the various inorganic materials which I have found to be effective are strong mineral acids such as concentrated sulphuric acid, concentrated nitric acid, and chlorosulphonic acid.

The concentration of stabilizing agents to be employed in monomeric vinylidene chloride may be varied depending upon the length of time which it is desired to stabilize the compound, upon the effectiveness of the particular agent employed, and upon whether any polymerization catalysts have previously been added to the vinylidene chloride. For most purposes a freshly distilled vinylidene chloride will be found to remain in monomeric form if there is added thereto from about 0.2 to about 2.0 per cent of one of the aforementioned stabilizing agents. In no case has it been found necessary to employ greater amounts of inhibitor than about 10 per cent of the weight of vinylidene chloride.

In a preferred method of carrying out my invention, a small amount of one of the stabilizing or inhibiting agents previously mentioned, suitably about 0.5 per cent based on the weight of vinylidene chloride, is added to freshly distilled monomeric vinylidene chloride, which may then be stored. When it is desired to utilize the stabilized vinylidene chloride in polymerization processes, the stabilizing agents may be readily and completely removed from the solution by shaking the mixture with dilute aqueous alkali. Another means of separating the inhibitor from the vinylidene chloride consists in distilling the latter material from the less volatile inhibitor. After the vinylidene chloride has been separated from the stabilizer it is found to polymerize readily when exposed to usual polymerizing conditions.

The following example serves to illustrate the practice of my invention:

Example 1

To two 30-gram mixtures containing 30 per cent vinyl chloride and 70 per cent vinylidene chloride, by weight, were added 0.15 gram each of benzoyl peroxide, chloracetyl chloride, and tetraethyl lead (a known catalyst mixture for the polymerization of vinylidene chloride). To one of the samples was added 1 milliliter of concentrated nitric acid. The two samples were placed in a constant temperature bath at 40° C. for approximately 4 days, at the end of which time the blank had polymerized to a solid while the sample to which nitric acid had been added showed no evidence of polymerization. This sample was subjected to a temperature of 40° C. for an additional period and at the end of a week was still free from evidence of polymerization.

Chlorosulphonic acid and sulphuric acid may be similarly employed to prevent the polymerization of monomeric vinylidene chloride.

This application is a division of my co-pending application Serial No. 151,721, filed July 2, 1937.

Other modes of applying the principle of my invention may be employed instead of those explained, change being made as regards the materials employed, provided the steps or materials stated in the following claims be thereby carried out or obtained.

I therefore particularly point out and distinctly claim as my invention:

1. A composition of matter comprising monomeric vinylidene chloride and sufficient of a material selected from the group consisting of nitric acid, sulphuric acid, and chlorosulphonic acid to prevent the polymerization of said vinylidene chloride.

2. A composition of matter comprising monomeric vinylidene chloride and between about 0.2 and about 10 per cent by weight of a material selected from the group consisting of nitric acid, sulphuric acid, and chlorosulphonic acid to prevent the polymerization of said vinylidene chloride.

3. A composition of matter comprising vinylidene chloride and between about 0.2 and about 10 per cent of nitric acid.

4. A composition of matter comprising vinylidene chloride and between about 0.2 and about 10 per cent of sulphuric acid.

5. A composition of matter comprising vinylidene chloride and between about 0.2 and about 10 per cent of chlorosulphonic acid.

RALPH M. WILEY.